(12) United States Patent
Otsuki et al.

(10) Patent No.: US 11,374,656 B2
(45) Date of Patent: Jun. 28, 2022

(54) OPTICAL WIRELESS COMMUNICATION SYSTEM, WIRELESS TRANSMITTING/RECEIVING APPARATUS AND OPTICAL WIRELESS COMMUNICATION METHOD

(71) Applicant: NIPPON TELEGRAPH AND TELEPHONE CORPORATION, Tokyo (JP)

(72) Inventors: Nobuaki Otsuki, Musashino (JP); Mizuki Suga, Musashino (JP); Kota Ito, Musashino (JP); Naoki Kita, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/414,859

(22) PCT Filed: Dec. 12, 2019

(86) PCT No.: PCT/JP2019/048622
§ 371 (c)(1),
(2) Date: Jun. 16, 2021

(87) PCT Pub. No.: WO2020/129791
PCT Pub. Date: Jun. 25, 2020

(65) Prior Publication Data
US 2022/0021456 A1    Jan. 20, 2022

(30) Foreign Application Priority Data

Dec. 19, 2018    (JP) .............................. JP2018-237611

(51) Int. Cl.
H04B 10/50        (2013.01)
H04B 10/2575     (2013.01)
H04B 10/272      (2013.01)

(52) U.S. Cl.
CPC ....... *H04B 10/501* (2013.01); *H04B 10/2575* (2013.01); *H04B 10/272* (2013.01)

(58) Field of Classification Search
None
See application file for complete search history.

(56) References Cited

U.S. PATENT DOCUMENTS

2015/0349912 A1*  12/2015  Komi ................. H04J 14/0246
                                                                  398/34
2017/0063486 A1*   3/2017  Sarashina ......... H04W 52/0206
(Continued)

FOREIGN PATENT DOCUMENTS

JP    2011172133 A    9/2011
JP    2015111774 A    6/2015
JP     6259272 B2     1/2018

OTHER PUBLICATIONS

Naotaka Shibata et al., Performance Evaluation of Mobile Front-Haul Employing Ethernet-Based TDM-PON With IQ Data Compression[Invited], IEEE/OSA Journal of Optical Communications and Networking, vol. 7,No. 11, 2015, pp. B16-B22.

*Primary Examiner* — David W Lambert (57) ABSTRACT

A wireless transmitter/receiver generates a first signal which notifies timing of a time slot allocated to each wireless station device, a conversion unit converts the first signal into an optical signal, and each of a plurality of antenna units converts the first signal from the optical signal into an electrical signal and transmits the electrical signal wirelessly. The wireless station device transmits a second signal at the timing reported by the first signal. Each of the plurality of antenna units converts the second signal wirelessly (Continued)

received from each wireless station device into an optical signal, and the conversion unit converts the second signal from the optical signal into an electrical signal. The wireless transmitter/receiver calculates, for each wireless station device, a transmission delay by using a difference between a reception time of the second signal and a reception time of a signal transmitted at the allocated timing by the wireless station device when it is assumed that there is no transmission delay. The wireless transmitter/receiver determines guard time between the time slots allocated to the wireless station devices based on the transmission delays of the wireless station devices.

5 Claims, 7 Drawing Sheets (56) References Cited

U.S. PATENT DOCUMENTS

| | | | | |
|---|---|---|---|---|
| 2017/0155981 A1* | 6/2017 | Nakagawa | ......... | H04Q 11/0005 |
| 2017/0250777 A1* | 8/2017 | Sarashina | ............... | H04J 14/08 |
| 2018/0076914 A1* | 3/2018 | Zhou | .................. | H04Q 11/0067 |
| 2018/0309563 A1* | 10/2018 | Hisano | ............... | H04B 10/2589 |

* cited by examiner

OPTICAL WIRELESS COMMUNICATION SYSTEM, WIRELESS TRANSMITTING/RECEIVING APPARATUS AND OPTICAL WIRELESS COMMUNICATION METHOD

CROSS-REFERENCE TO RELATED APPLICATIONS

This application is a 371 U.S. National Phase of International Application No. PCT/JP2019/048622 filed on Dec. 12, 2019, which claims priority to Japanese Application No. 2018-237611 filed on Dec. 19, 2018. The entire disclosures of the above applications are incorporated herein by reference.

TECHNICAL FIELD

The present invention relates to an optical wireless communication system, a wireless transmission/reception device, and an optical wireless communication method.

BACKGROUND ART

In recent years, attention is focused on utilization of a millimeter wave band capable of securing a frequency band wider than that of a microwave band. However, the amount of attenuation of the millimeter wave band during propagation through air is larger than that of the microwave band, and hence the millimeter wave band is not suitable for long-distance wireless transmission. Consequently, a problem arises in that it is not possible to extend a coverage area and it is difficult to increase user capacity efficiency of a system in an area in which user density is low.

Figure 5:
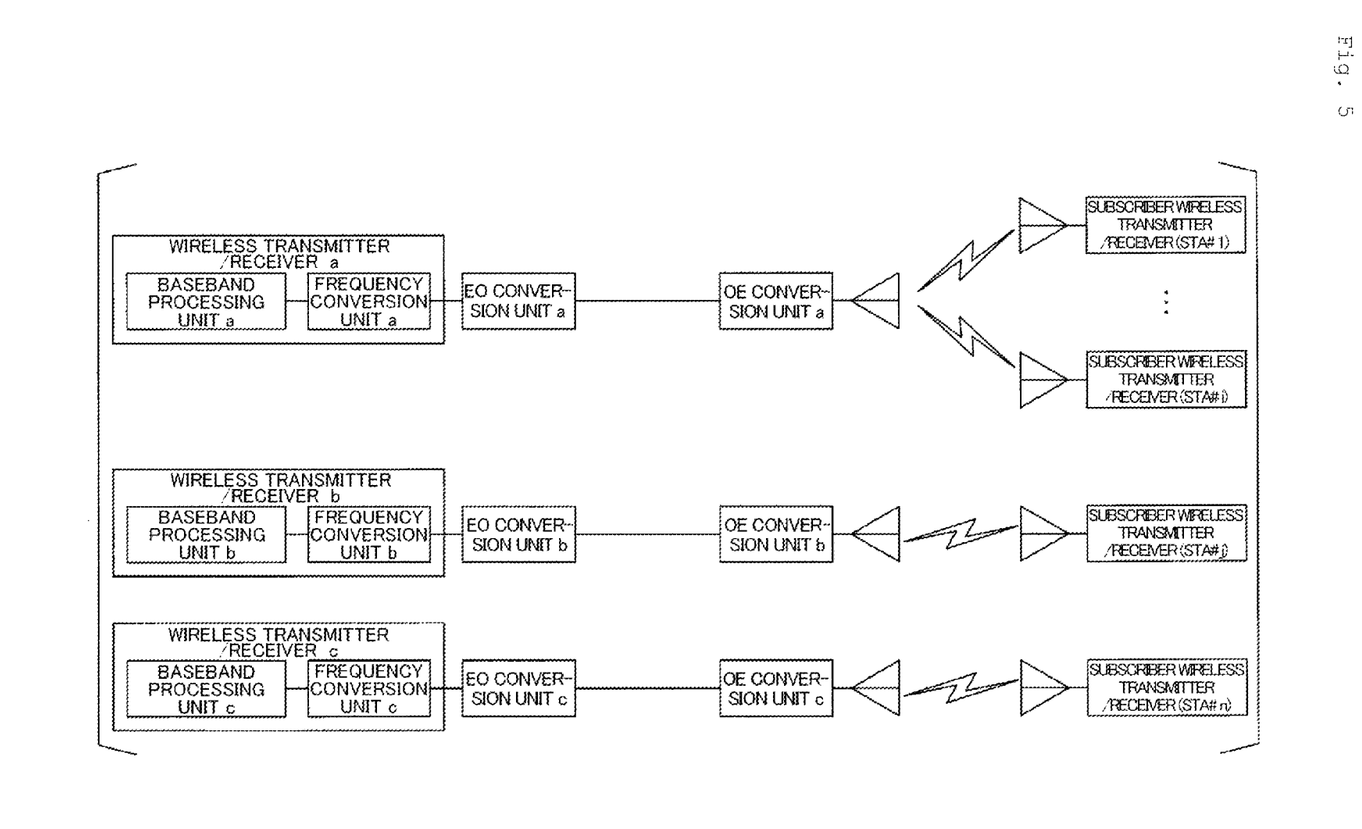
FIG. 5 is a view showing the configuration of a conventional optical wireless communication system.

As a method for solving this problem, there is proposed a method in which, as shown in FIG. 5, antennas are disposed close to subscriber wireless transmitter/receivers (STA #1, . . . , #i, #j, #n) of users by separating an antenna unit and a signal processing unit (baseband processing unit) of each of wireless devices on the side of an exchange station from each other by using RoF (radio on fiber), and a seeming coverage area can be extended. Between the antenna unit and the signal processing unit, transmission and reception are performed with an optical signal by using an EO (electrical/optical) conversion unit and an OE (optical/electrical) conversion unit. In a technique shown in FIG. 5, a method for improving laying efficiency of a fiber with a combination of a PON (passive optical network) is also examined. With regard to implementation of RoF which uses the PON, as a method for allowing communication of signals transmitted and received between a plurality of the antenna units and the subscriber wireless transmitter/receivers without interference between the signals, a TDM (time division multiplexing)-PON (see, e.g., NPL 1) and a WDM (wave division multiplexing)-PON (see PTL 1) are often examined.

Figure 6:
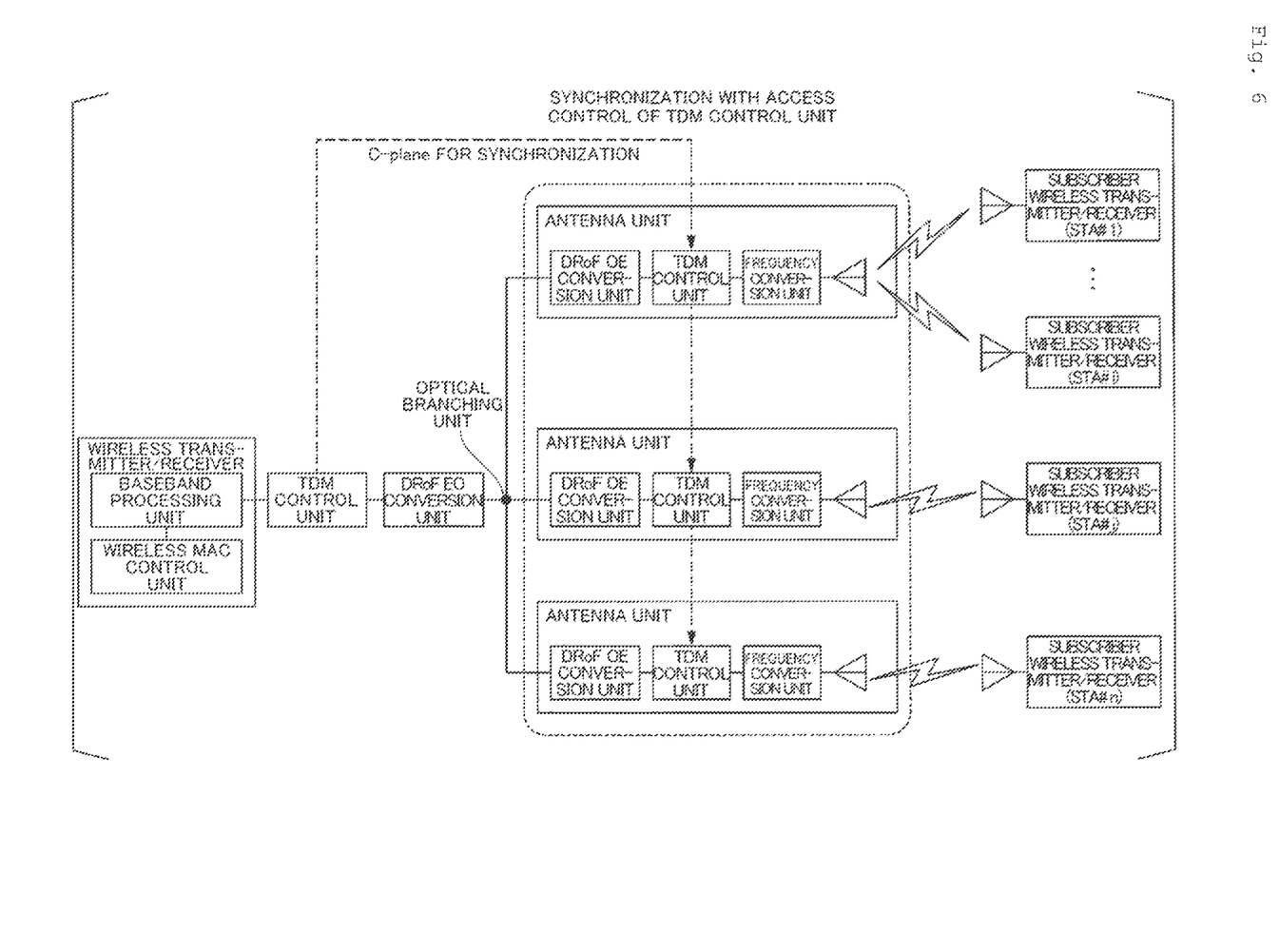
FIG. 6 is a view showing the configuration of the conventional optical wireless communication system.
Figure 7:
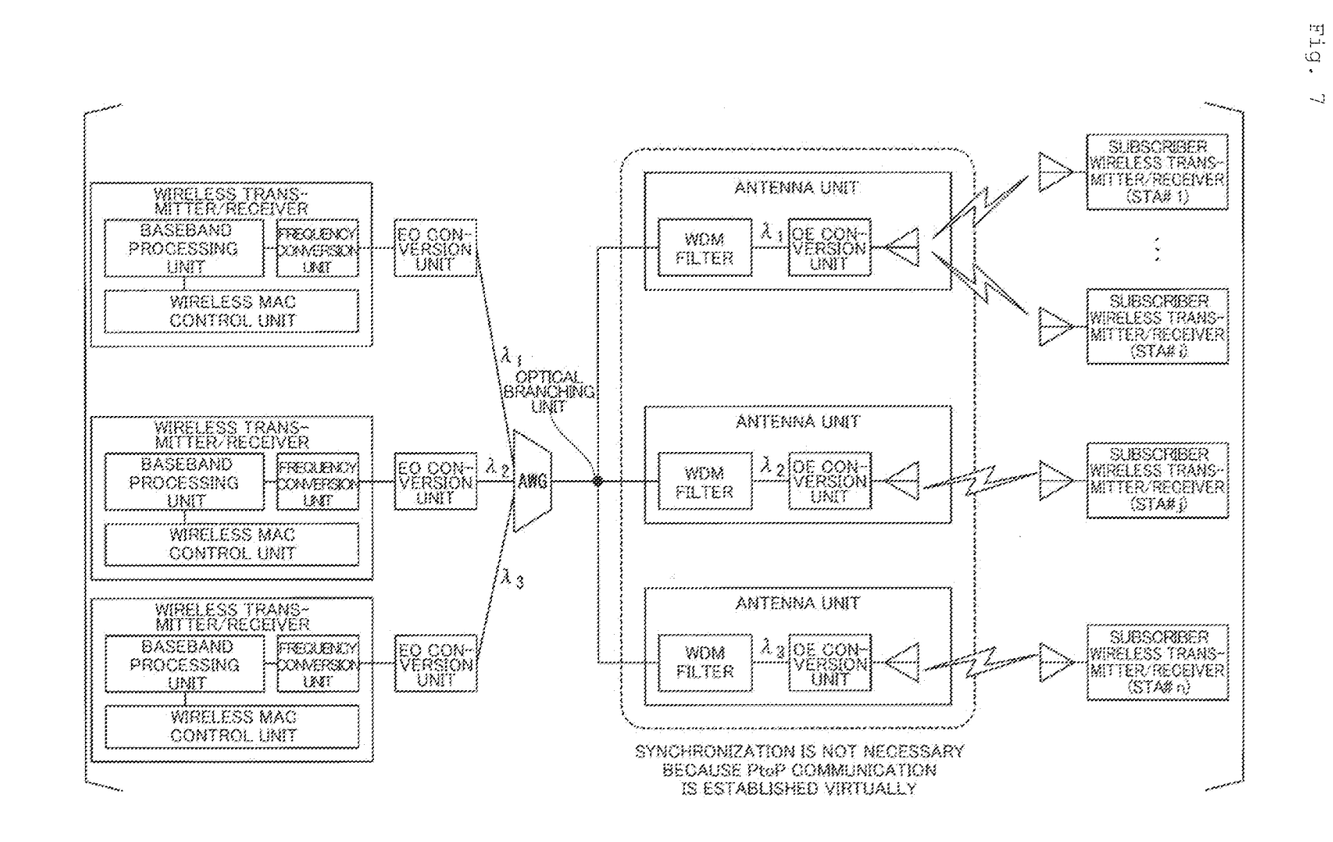
FIG. 7 is a view showing the configuration of the conventional optical wireless communication system.

In the TDM-PON between an antenna unit and a signal processing unit (baseband processing unit) shown in FIG. 6, allocated times of a plurality of the antenna units at which communication is allowed are shifted from each other by access control of a TDM control unit, and interference is thereby avoided. However, in the case where TDM is used, a problem arises in that temporal synchronization control between the signal processing unit and the antenna unit is needed. On the other hand, in the WDM-PON between an antenna unit and a signal processing unit (baseband processing unit) shown in FIG. 7, communication between the signal processing unit and the antenna unit is replaced with PtoP (Point to Point) communication artificially by separately performing transmission operations and reception operations of a plurality of the antenna units by using wavelengths, and interference avoidance is thereby implemented. AWG (Array Waveguide Gratings) shown in the drawing performs demultiplexing and multiplexing of wavelengths $\lambda_1$, $\lambda_2$, and $\lambda_3$ used in individual combinations of the antenna units and the signal processing units. As compared with the TDM-PON, the WDM-PON needs extra wavelengths. However, in the WDM-PON, the synchronization control which is used in TDM is not necessary, and hence implementation which is simple in terms of signal processing can be realized.

However, in RoF which uses the WDM-PON, signal processing units of which the number is equal to the number corresponding to the multiplexing (the number of antenna units) are needed. Therefore, cost of the signal processing unit is increased, and RoF which uses the WDM-PON does not serve as a direct solution of the problem in which the user capacity efficiency needs to be improved. In order to improve the user capacity efficiency, it is desirable to use a method in which the cost of the signal processing unit is reduced by multiplexing the antenna unit by using the TDM-PON and setting a ratio between the number of signal processing units and the number of antenna units in one-to-many relationships especially in an area in which user density is low. However, as described above, in the case where the TDM-PON is used, temporal synchronization between the signal processing unit and a plurality of the antenna units is needed.

A method for implementing RoF is roughly divided into DRoF (digital RoF) and ARoF (analog RoF). DRoF is used in the CPRI (Common Public Radio Interface) specification or the like. In DRoF, an RF (Radio Frequency) signal is quantized and superimposed on an optical signal as a digital signal on a transmission side (wireless transmitter/receiver), and the RF signal is reproduced on an opposing side (antenna unit). In ARoF, the RF signal is transmitted with direct light intensity modulation or the like, and digital signal processing is not performed on the opposing side. In ARoF, the digital signal processing on the opposing side is not necessary, and hence ARoF has an advantage that power consumption is reduced. However, in ARoF, it is not possible to perform complicated processing such as synchronization processing in the antenna unit, and hence ARoF has a problem in which it is difficult to combine ARoF with the TDM-PON.

CITATION LIST

Patent Literature

[PTL 1] Japanese Patent Application Publication No. 2011-172133

Non Patent Literature

[NPL 1] Naotaka Shibata, et. al, "Performance Evaluation of Mobile Front-Haul Employing Ethernet-Based TDM-PON With IQ Data Compression", IEEE/OSA Journal of Optical Communications and Networking, November 2015, Vol. 7, No. 11

SUMMARY OF THE INVENTION

Technical Problem

In the case where RoF is implemented by using the TDM-PON which has the user capacity efficiency higher than that of the WDM-PON and is capable of reducing the cost, it is necessary to perform time division multiplexing of a plurality of the antenna units. However, it is difficult for the antenna unit in ARoF having low power consumption to perform complicated processing such as the time division multiplexing, and the antenna unit in ARoF is not used in a system which includes two-way communication.

In view of the above circumstances, an object of the present invention is to provide an optical wireless communication system, a wireless transmission/reception device, and an optical wireless communication method capable of extending a coverage area of wireless transmission while reducing cost.

Means for Solving the Problem

An aspect of the present invention is an optical wireless communication system in which an exchange station device and a plurality of wireless station devices perform wireless communication, wherein the exchange station device includes: a plurality of antenna units which perform processing of wirelessly transmitting an electrical signal obtained by converting an optical signal input via an optical transmission line to each of the plurality of wireless station devices and processing of converting a wirelessly received signal from the wireless station device into an optical signal and outputting the optical signal to the optical transmission line; a wireless transmitter/receiver which performs generation processing of a signal addressed to the wireless station device and reception processing of a signal from the wireless station device; and a conversion unit which performs processing of converting the signal generated by the wireless transmitter/receiver into an optical signal and outputting the optical signal to each of the plurality of antenna units via the optical transmission line and processing of receiving the signal from the wireless station device as an input via the optical transmission line from each of the plurality of antenna units, converting the signal from an optical signal into an electrical signal, and transmitting the electrical signal to the wireless transmitter/receiver, the wireless transmitter/receiver includes: a signal generation unit which generates a first signal which notifies timing of a time slot allocated to each wireless station device; a transmission delay calculation unit which calculates, for each wireless station device, a transmission delay by using a difference between a reception time of a second signal transmitted by the wireless station device correspondingly to the first signal and a reception time of a signal transmitted at the allocated timing by the wireless station device when it is assumed that there is no transmission delay; and a guard time determination unit which determines guard time between the time slots allocated to the wireless station devices based on the transmission delays of the wireless station devices calculated by the transmission delay calculation unit, and the wireless station device includes: a reception unit which receives the first signal transmitted from the antenna unit wirelessly; a control unit which obtains information on the timing allocated to the wireless station device to which the control unit belongs from the first signal and performs control such that the second signal is transmitted at the timing; and a transmission unit which transmits the second signal to the exchange station device wirelessly according to the control of the control unit.

An aspect of the present invention is the above-described optical wireless communication system, wherein the wireless transmitter/receiver repeats transmission of the first signal, reception of the second signal transmitted by each of the plurality of wireless station devices correspondingly to the first signal, calculation of the transmission delay in each wireless station device, and determination of the guard time.

An aspect of the present invention is the above-described optical wireless communication system, wherein the guard time determination unit determines the guard time by using a value which is twice a maximum transmission delay selected from among the transmission delays of the wireless station devices.

An aspect of the present invention is a wireless transmission/reception device used in an exchange station device which performs wireless communication with a plurality of wireless station devices, the wireless transmission/reception device including: a signal generation unit which generates a first signal which notifies timing of a time slot allocated to each of the plurality of wireless station devices, and outputs the first signal to a conversion unit which converts the generated first signal from an electrical signal into an optical signal and transmits the optical signal to each of a plurality of antenna units; a transmission delay calculation unit which receives a second signal transmitted wirelessly by the wireless station device correspondingly to the first signal, received and converted into an optical signal by the antenna unit, and converted from the optical signal into an electrical signal by the conversion unit, and calculates, for each wireless station device, a transmission delay by using a difference between a reception time of the second signal and a reception time of a signal transmitted at the allocated timing by the wireless station device when it is assumed that there is no transmission delay; and a guard time determination unit which determines guard time between the time slots allocated to the wireless station devices based on the transmission delays of the wireless station devices calculated by the transmission delay calculation unit.

An aspect of the present invention is an optical wireless communication method in an optical wireless communication system in which an exchange station device and a plurality of wireless station devices perform wireless communication, the optical wireless communication method comprising: in the exchange station device, a signal generation step of generating, by a wireless transmitter/receiver, a first signal which notifies timing of a time slot allocated to each of the plurality of wireless station devices; a first conversion step of converting, by a conversion unit, the first signal generated in the signal generation step into an optical signal and transmitting, by a conversion unit, the optical signal to each of a plurality of antenna units via an optical transmission line; a first transmission step of receiving, by the plurality of antenna units, the first signal converted in the first conversion step as an input thereto via the optical transmission line, converting, by the plurality of antenna units, the input first signal from the optical signal into an electrical signal, and wirelessly transmitting, by the plurality of antenna units, the electrical signal to the wireless station device; in the wireless station device, a first reception step of receiving the wirelessly transmitted first signal in the wireless station device; a control step of acquiring information on the timing allocated to the wireless station device from the first signal and performing control such that a second signal is transmitted at the timing in the wireless station device; a second transmission step of transmitting the second signal to the exchange station device wirelessly according to the control in the control step; in the exchange station device, a second reception step of converting, by the plurality of antenna units, the wirelessly received second signal from the wireless station device into an optical signal and outputting, by the plurality of antenna units, the optical signal to the conversion unit via the optical transmission line in the exchange station device; a second conversion step of receiving, by the conversion unit, the second signal output in the second reception step as an input thereto via the optical transmission line, converting, by the conversion unit, the input second signal from the optical signal into an electrical signal, and transmitting, by the conversion unit, the electrical signal to the wireless transmitter/receiver in the exchange station device; and the steps executed by the wireless transmitter/receiver including a transmission delay calculation step of calculating, for each wireless station device, a transmission delay based on a difference between a reception time of the second signal transmitted by the wireless station device correspondingly to the first signal and a reception time of a signal transmitted at the allocated timing by the wireless station device when it is assumed that there is no transmission delay and a guard time determination step of determining guard time between the time slots allocated to the wireless station devices based on the transmission delays of the wireless station devices calculated in the transmission delay calculation step.

Effects of the Invention

According to the present invention, it becomes possible to extend the coverage area of the wireless transmission while reducing the cost.

DESCRIPTION OF EMBODIMENTS

Hereinbelow, an embodiment of the present invention will be described in detail with reference to the drawings.

In a conventional optical wireless communication system using RoF which is shown in FIG. 5, a wireless transmitter/receiver and a physical antenna are in a one-to-one relationship. Consequently, even in the case where the number of accommodated users per area which can be covered by one antenna is less than the maximum number of users who can be accommodated in the wireless transmitter/receiver, it is necessary to prepare wireless transmitter/receivers which are equal in number to antennas. Consequently, user capacity efficiency per wireless transmitter/receiver is reduced, and cost may be increased.

To cope with this, in the present embodiment, a coupler serving as an optical branching unit is inserted into RoF such that RoF has a form of a PON (passive optical network), and a plurality of antennas are thereby connected to one wireless transmitter/receiver. In addition, time division multiplexing control is performed between the wireless transmitter/receiver on the side of an exchange station having AP function and a subscriber wireless transmitter/receiver of a user. When this control is performed, access multiplexing based on time division between the subscriber wireless transmitter/receivers is controlled intensively by the wireless transmitter/receiver on the side of the exchange station. Guard time between time slots set when the time division multiplexing control is performed is set to a value in which transmission delays between the wireless transmitter/receiver on the side of the exchange station and all of the subscriber wireless transmitter/receivers are reflected, and interference between the slots is thereby avoided.

In order to perform the control described above, the wireless transmitter/receiver on the side of the exchange station wirelessly transmits beacons at regular time intervals periodically through an RoF-PON type optical fiber network to all of the subscriber wireless transmitter/receivers under the control of the wireless transmitter/receiver. With application of the RoF-PON, the side of the exchange station can broadcast wireless signals to all of the subscriber wireless transmitter/receivers equivalently. Reception timing of the beacon in each of the subscriber wireless transmitter/receivers differs according to a transmission delay of each wireless station device. The transmission delay is represented by the sum of an optical transmission delay of an optical fiber from a signal processing unit of the wireless transmitter/receiver on the side of the exchange station to an antenna unit and a wireless transmission delay from the antenna unit to the subscriber wireless transmitter/receiver. That is, the transmission delay is a value obtained by adding an optical transmission section based on RoF and a wireless transmission section.

The wireless transmitter/receiver on the side of the exchange station notifies a transmission time slot allocated to each subscriber wireless transmitter/receiver with the beacon. The wireless transmitter/receiver on the side of the exchange station calculates the transmission delay based on a difference between a time 1 and a time 2 described below. The above-mentioned time 1 is a signal reception time in the case where it is assumed that the delay of a signal transmitted by the subscriber wireless transmitter/receiver in an allocated time slot is 0. The above-mentioned time 2 is a reception time of a signal which is actually transmitted wirelessly by the subscribed wireless transmitter/receiver in the allocated slot. The wireless transmitter/receiver on the side of the exchange station determines the guard time based on the longest transmission delay selected from among the transmission delays of the subscriber wireless transmitter/receivers. With this, the RoF-PON is applied to the side of the exchange station, and the antenna unit does not need to perform time division control while a plurality of the antenna units are connected to one wireless transmitter/receiver. Further, it becomes possible to reduce the guard time to a minimum length such that signals of the individual subscriber wireless transmitter/receivers do not collide with each other in the wireless section and the optical transmission section and perform the time division multiplexing. Therefore, it becomes possible to improve the user capacity efficiency per wireless transmitter/receiver to reduce the cost.

Figure 1:
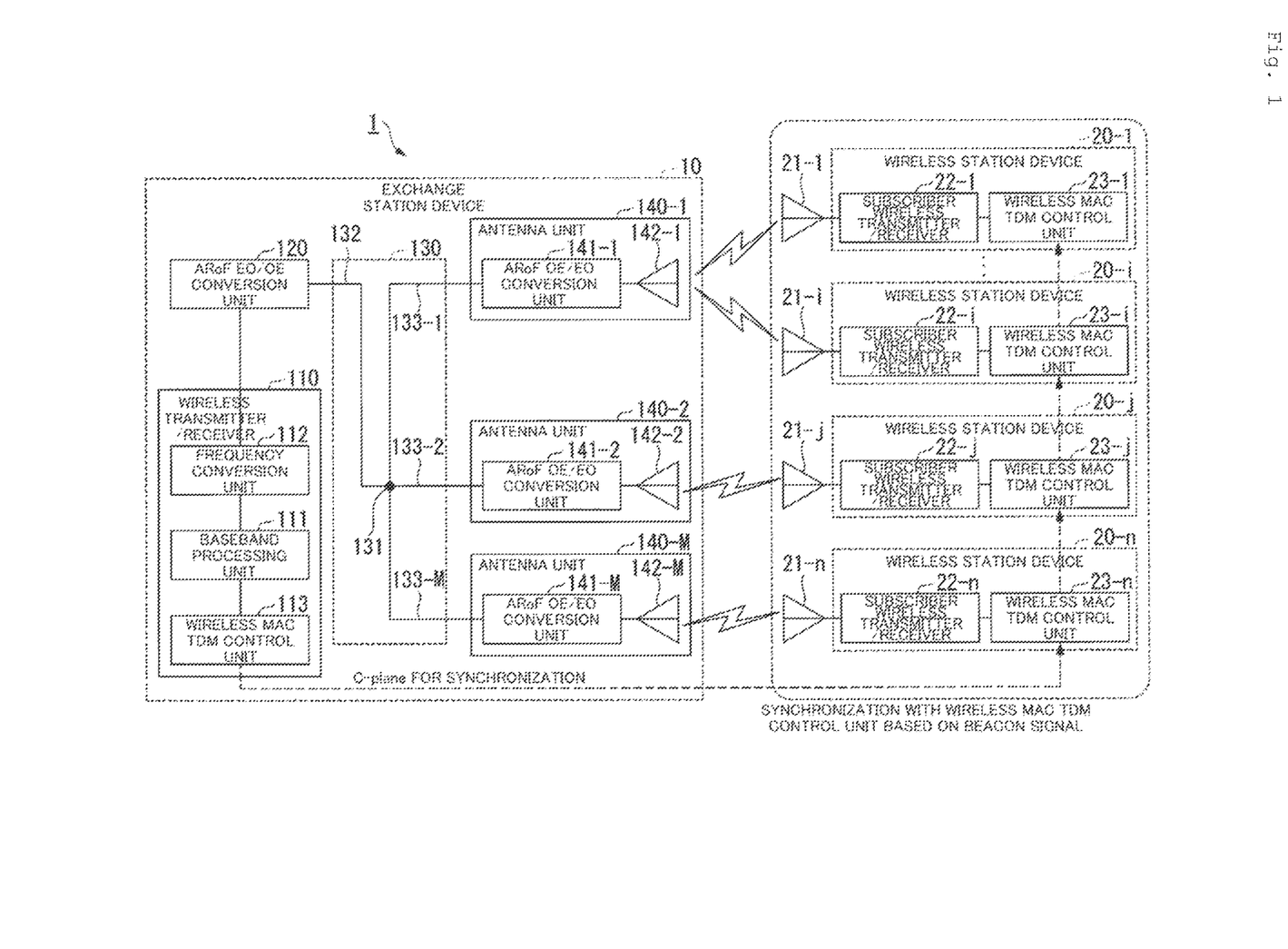
FIG. 1 is a view showing the configuration of an optical wireless communication system according to an embodiment of the present invention.

FIG. 1 is a view showing the configuration of an optical wireless communication system 1 according to an embodiment of the present embodiment. The optical wireless communication system 1 includes an exchange station device 10 and N wireless station devices 20. In the following description, N (N is an integer of not less than 1) wireless station devices 20 are written as wireless station devices 20-1 to 20-N. FIG. 1 describes four wireless station devices 20-1, 2-i, 20-j, and 20-n (i≠j≠n is satisfied and each of i, j, and n is an integer of not less than 2 and not more than N).

The exchange station device 10 is, e.g., an access point (AP) device. The exchange station device 10 includes a wireless transmitter/receiver 110, an ARoF EO/OE conversion unit 120, an optical fiber network 130, and M antenna units 140. M (M is an integer of not less than 2) antenna units 140 are written as antenna units 140-1 to 140-M.

The wireless transmitter/receiver 110 has temporal synchronization function and AP function. The wireless transmitter/receiver 110 includes a baseband processing unit 111, a frequency conversion unit 112, and a wireless MAC (Media Access Control) TDM control unit 113.

The baseband processing unit 111 performs generation and reception of a baseband signal. The baseband signal generated by the baseband processing unit 111 is a signal which is transmitted to the wireless station device 20. The signal transmitted to the wireless station device 20 includes a signal for temporal synchronization such as a C (Control)-Plane beacon for synchronization. The C-Plane is a wireless communication channel for control. In addition, the baseband signal received by the baseband processing unit 111 is a signal which is transmitted from the wireless station device 20.

The frequency conversion unit 112 performs frequency conversion such as up-conversion on a signal such as the beacon generated by the baseband processing unit 111, and outputs the signal to the ARoF EO/OE conversion unit 120. In addition, the frequency conversion unit 112 performs frequency conversion such as down-conversion on an electrical signal input from the ARoF EO/OE conversion unit 120, and outputs the electrical signal to the baseband processing unit 111.

The wireless MAC TDM control unit 113 is synchronized with wireless MAC TDM control units 23 of the individual wireless station devices 20 described later based on a C-Plane beacon signal for synchronization. A line between the wireless MAC TDM control unit 113 and the wireless MAC TDM control unit 23 of each wireless station device 20 described in FIG. 1 denotes that synchronization is performed.

The ARoF EO/OE conversion unit 120 converts a signal output by the frequency conversion unit 112 from an electrical signal into an optical signal with ARoF, and outputs the optical signal to the optical fiber network 130. In addition, the ARoF EO/OE conversion unit 120 receives an optical signal output by the antenna unit 140 from the optical fiber network 130, converts the optical signal into an electrical signal with ARoF, and outputs the electrical signal to the wireless transmitter/receiver 110.

The optical fiber network 130 is a network in the form of the PON capable of optical transmission of a wireless signal in RoF. An optical branching unit 131 of the optical fiber network 130 is, e.g., a coupler. The optical branching unit 131 receives an optical signal output from the ARoF EO/OE conversion unit 120 via an optical fiber 132, causes the received optical signal to branch to optical fibers 133-1 to 133-M, and outputs the optical signals to the antenna units 140-1 to 140-M. In addition, the optical branching unit 131 performs time division multiplexing on optical signals received from the antenna units 140-1 to 140-M via the optical fibers 133-1 to 133-M, and outputs the signals subjected to the multiplexing to the ARoF EO/OE conversion unit 120 via the optical fiber 132.

The antenna unit 140 includes an ARoF OE/EO conversion unit 141 and an antenna element 142. In the following description, the ARoF OE/EO conversion unit 141 and the antenna element 142 of the antenna unit 140-m (m is an integer of not less than 1 and not more than M) are written as the ARoF OE/EO conversion unit 141-m and the antenna element 142-m, respectively. The ARoF OE/EO conversion unit 141-m converts an optical signal received from the optical fiber network 130 into an electrical signal with ARoF, and outputs the electrical signal to the antenna element 142-m. In addition, the ARoF OE/EO conversion unit 141-m converts a wireless signal received by the antenna element 142-m from an electrical signal into an optical signal with ARoF, and outputs the optical signal to the optical fiber network 130. The antenna element 142-m emits an electrical signal output by the ARoF OE/EO conversion unit 141-m with a wireless signal. In addition, the antenna element 142-m receives a wireless signal, and outputs the wireless signal to the ARoF OE/EO conversion unit 141-m.

The wireless station device 20 has temporal synchronization function of performing temporal synchronization with an instruction from the exchange station device 10. The wireless station device 20 includes an antenna element 21, a subscriber wireless transmitter/receiver 22, and the wireless MAC TDM control unit 23. In the following description, the antenna element 21, the subscriber wireless transmitter/receiver 22, and the wireless MAC TDM control unit 23 of the wireless station device 20-k (k is an integer of not less than 1 and not more than N) are written as the antenna element 21-k, the subscriber wireless transmitter/receiver 22-k, and the wireless MAC TDM control unit 23-k, respectively. In addition, the subscriber wireless transmitter/receiver 22-k is also written as STA #k.

The antenna element 21-k receives a wireless signal and outputs the wireless signal to the subscriber wireless transmitter/receiver 22-k. In addition, the antenna element 21-k emits a signal output by the subscriber wireless transmitter/receiver 22-k wirelessly. The subscriber wireless transmitter/receiver 22-k performs reception processing on the wireless signal received by the antenna element 21-k. In addition, the subscriber wireless transmitter/receiver 22-k outputs a transmission signal generated by performing transmission processing on transmission data to the antenna element 21-k. The wireless MAC TDM control unit 23-k is synchronized with the wireless MAC TDM control unit 113 of the exchange station device 10 based on the C-Plane beacon signal for synchronization.

Note that conversion of the center frequency of the signal when the wireless transmitter/receiver 110 performs transmission and reception may be performed by the wireless transmitter/receiver 110 or may also be performed by the antenna unit 140. In the case where the conversion thereof is performed by the antenna unit 140, optical modulation is performed with IF (Intermediate Frequency) in RoF.

Next, the operation of the optical wireless communication system 1 will be described. The baseband processing unit 111 of the exchange station device 10 generates a beacon for temporal synchronization. The beacon includes allocation information of time division time slots allocated to the subscriber wireless transmitter/receivers 22-1 to 22-N by the wireless MAC TDM control unit 113. The frequency conversion unit 112 performs frequency conversion on the beacon generated by the baseband processing unit 111, and outputs the beacon. The beacons are transmitted to the ARoF EO/OE conversion unit 120, the optical fiber network 130, and the antenna units 140-1 to 140-M, and are transmitted from all of the antenna units 140-1 to 140-M to all of the wireless station devices 20-1 to 20-N.

The subscriber wireless transmitter/receiver 22-k of the wireless station device 20-k (k is an integer of not less than 1 and not more than N) receives the beacon with the antenna element 21-k. The wireless MAC TDM control unit 23-k controls the subscriber wireless transmitter/receiver 22-k such that transmission and reception are performed in the time slot allocated to the wireless station device 20-k based on the allocation information set in the beacon. Note that the length of the time slot may be fixed or variable, and the length of the time slot is defined for each beacon signal. In a time division multiplexing system, the guard time for avoiding interference between the time slots is provided.

The wireless MAC TDM control unit 113 of the exchange station device 10 calculates the guard time between the time slots which is required to avoid the interference between the slots when the time division multiplexing is performed in the following manner. That is, the wireless MAC TDM control unit 113 calculates a time period obtained by adding the transmission delay in the wireless transmission section from the antenna unit 140 to the subscriber wireless transmitter/receiver 22 to the transmission delay in the RoF transmission section from the baseband processing unit 111 to the antenna unit 140 based on the transmission signals from the individual subscriber wireless transmitter/receivers 22-1 to 22-N. The wireless MAC TDM control unit 113 determines the guard time between the time slots based on the longest time period selected from among the time periods calculated for the individual subscriber wireless transmitter/receivers 22. A length which is twice the maximum length of the transmission delay selected from among the transmission delays of the individual subscriber wireless transmitter/receivers 22-1 to 22-N, each of which is represented by the sum of the optical transmission delay and the wireless transmission delay, is set as the guard time in the present embodiment. Suppose that one subscriber wireless transmitter/receiver 22 has one transmission delay. In the case where one subscriber wireless transmitter/receiver 22 is capable of communicating with a plurality of the antenna units 140, it is assumed that the subscriber wireless transmitter/receiver 22 belongs to the antenna unit 140 which minimizes the total transmission delay.

With this, even in ARoF in which the antenna unit 140 does not perform synchronization processing, two-way transmission based on the TDM-PON is allowed inexpensively and, as a result, it becomes possible to extend a wireless transmission area at low cost.

Figure 2:
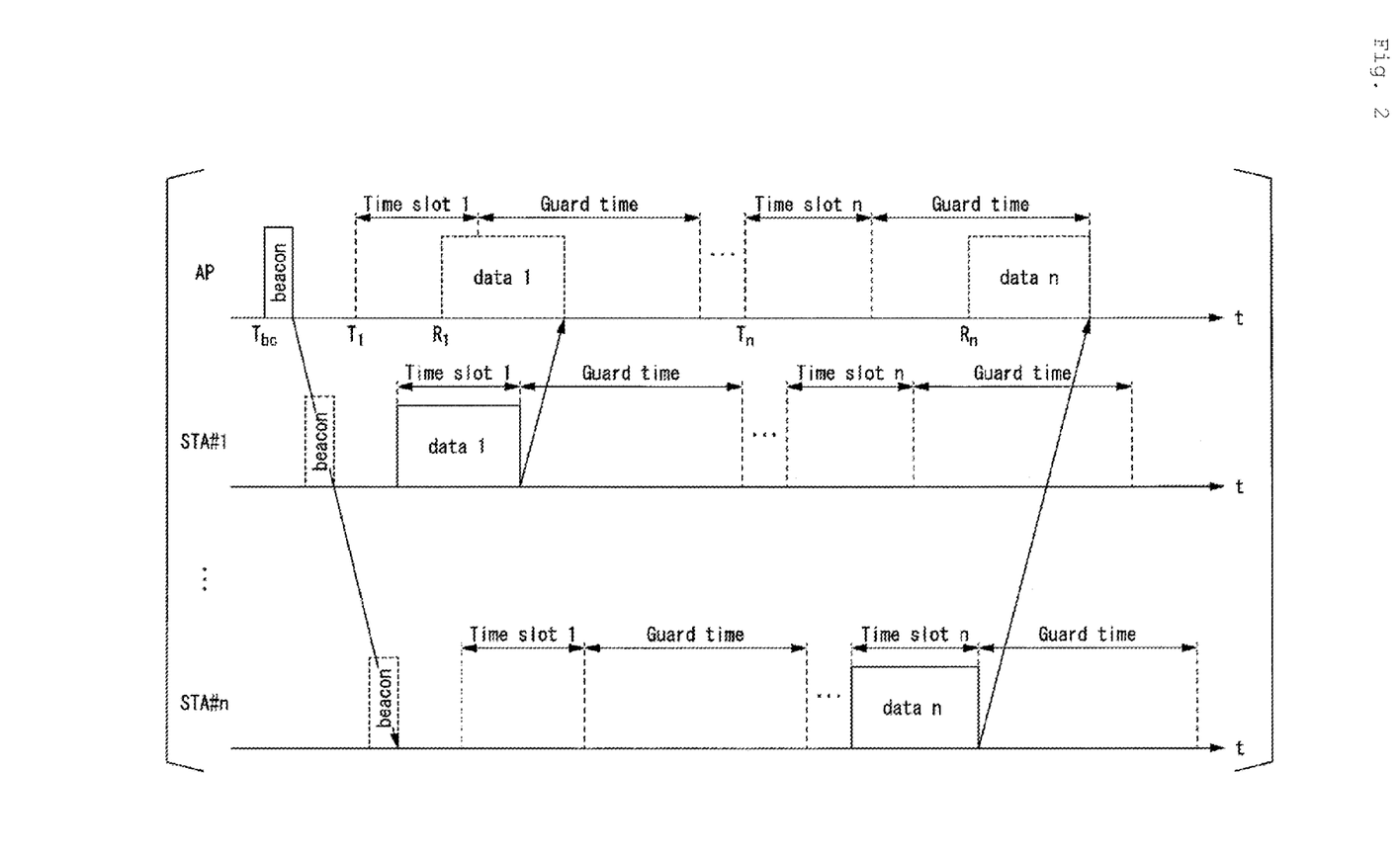
FIG. 2 is a sequence diagram of signal transmission and reception of the optical wireless communication system according to the embodiment.

FIG. 2 is a sequence diagram of signal transmission and reception in the optical wireless communication system 1. In FIG. 2, AP denotes the wireless transmitter/receiver 110 of the exchange station device 10, and STA #1 to STA #n denote the subscriber wireless transmitter/receivers 22-1 to 22-N (i.e., n=N is satisfied in FIG. 2). Note that the maximum value of a transmission delay amount as the system may be set in advance. In addition, the wireless station devices 20-1 to 20-N may move, and hence the transmission delay may be calculated at the transmission timing of each of the wireless station devices 20-1 to 20-N for each beacon interval, and the transmission delay amount may be reflected in the guard time when the next beacon is emitted. This processing will be described in FIG. 3 described later.

As described above, the wireless MAC TDM control unit 113 of the wireless transmitter/receiver 110 allocates the transmission time slot to the subscriber wireless transmitter/receiver 22 of each wireless station device 20, and sets the allocation in the beacon. Herein, for simplicity, suppose that a time slot k is allocated to the wireless station device 20-k. Further, the wireless MAC TDM control unit 113 similarly sets the transmission timing to the wireless station device from the wireless transmitter/receiver 110 in the beacon. The wireless MAC TDM control unit 23 of the wireless station device 20 serving as a destination in the slot of the transmission timing performs control such that the subscriber wireless transmitter/receiver 22 performs reception operation.

A transmission delay $D_k$ of the subscriber wireless transmitter/receiver 22-k (k is an integer of not less than 1 and not more than N) is calculated by the following formula (1).

$$D_k=(R_k-T_k)/2 \qquad (1)$$

Herein, $R_k$ denotes timing (absolute time) at which the wireless transmitter/receiver 110 has actually received a signal (data k) from the subscriber wireless transmitter/receiver 22-k. $T_k$ denotes possible transmission start timing of the subscriber wireless transmitter/receiver 22-k in the case where the transmission delay until when the beacon signal transmitted from the wireless transmitter/receiver 110 is received in the subscriber wireless transmitter/receiver 22-k is assumed to be 0. That is, $T_k$ denotes a start time of the time slot k which is allocated to the subscriber wireless transmitter/receiver 22-k, is set in the beacon, and is reported. The baseband processing unit 111 calculates the transmission delay $D_k$ of each subscriber wireless transmitter/receiver 22-k with the above formula (1).

In the case where a downstream wavelength and an upstream wavelength in the optical fibers 132 and 133-1 to 133-M are different from each other, the transmission delay in the case of the downstream wavelength is different from the transmission delay in the case of the upstream wavelength. Consequently, to be precise, the transmission delay $D_k$ is not ½ of $R_k-T_k$. However, in setting of the guard time, a round-trip transmission delay matters, and hence it is not necessary to grasp a precise one-way delay, and calculation based on the assumption of the above formula (1) has no problem. The wireless MAC TDM control unit 113 selects a maximum value $D_{max}$ from among calculated transmission delays Di to $D_N$, and determines the guard time by doubling the maximum value $D_{max}$, or adding or subtracting a predetermined small value to or from a value obtained by doubling the maximum value $D_{max}$.

Figure 3:
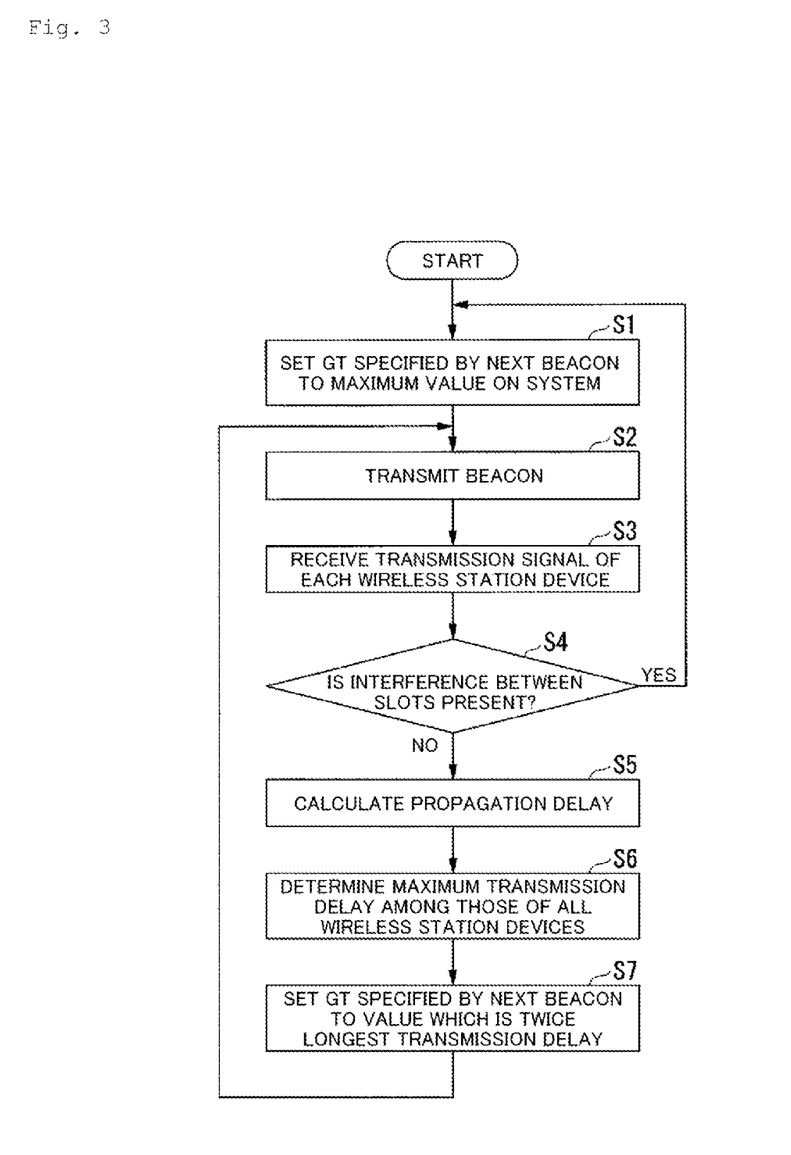
FIG. 3 is a flowchart of transmission delay update processing in a wireless transmitter/receiver according to the embodiment.

FIG. 3 is a flowchart of transmission delay update processing in the wireless transmitter/receiver 110. First, as the value of guard time (GT) specified by the next beacon, the maximum value on the system is set automatically or manually in the wireless MAC TDM control unit 113 of the exchange station device 10 (Step S1). The exchange station device 10 transmits the beacon signal (Step S2). Each of the wireless station devices 20-1 to 20-N obtains information on the time slot allocated to the wireless station device from the received beacon, and transmits the signal in the time slot. The wireless transmitter/receiver 110 of the exchange station device 10 receives the transmission signal from each of the wireless station devices 20-1 to 20-N (Step S3). The baseband processing unit 111 of the wireless transmitter/receiver 110 determines whether or not interference between the slots is present in the transmission signals from the wireless station devices 20-1 to 20-N (Step S4). In the case where the baseband processing unit 111 determines that the interference between the slots is present (Step S4: YES), the processing returns to Step S1, a maximum value greater than the current value is set as the guard time.

In the case where the baseband processing unit 111 determines that the interference between the slots is not present (Step S4: NO), the wireless MAC TDM control unit 113 calculates the transmission delay with the above formula (1) based on the reception time of the transmission signal from each of the wireless station devices 20-1 to 20-N (Step S5). The wireless MAC TDM control unit 113 selects the maximum transmission delay from among the transmission delays calculated for all of the wireless station devices 20-1 to 20-N (Step S6). The wireless MAC TDM control unit 113 sets the guard time specified by the next beacon to a value which is twice the transmission delay selected in Step S6 (Step S7). The wireless transmitter/receiver 110 repeats the steps of the processing from Step S2.

Figure 4:
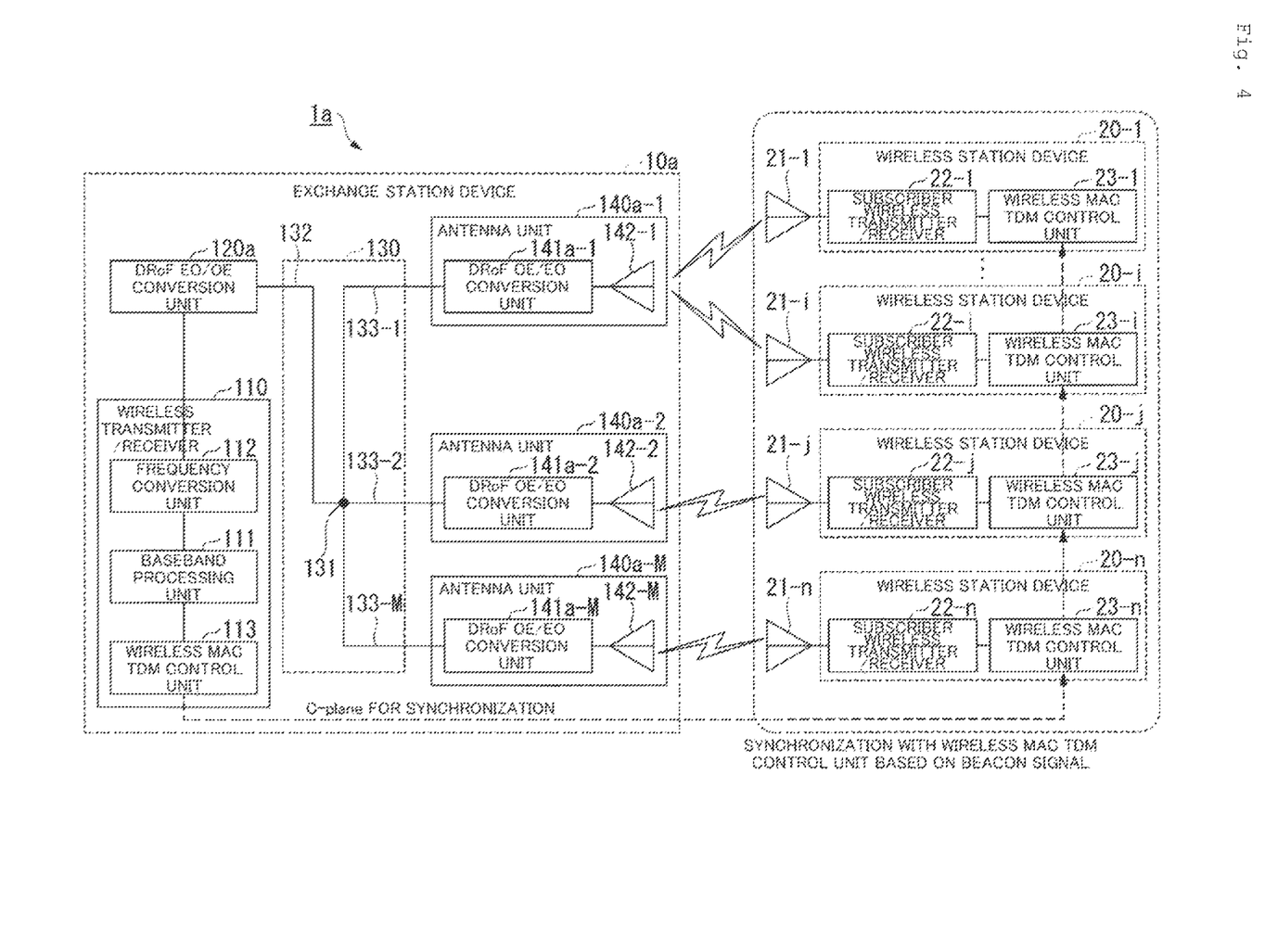
FIG. 4 is a view showing another configuration of the optical wireless communication system according to the embodiment.

While the present embodiment displays an effect particularly in ARoF, the present embodiment can also be applied to DRoF. FIG. 4 is a view showing the configuration of an optical wireless communication system 1a which uses DRoF. In the drawing, the same portions as those of the optical wireless communication system 1 shown in FIG. 1 are designated by the same reference numerals, and the description thereof will be omitted. The optical wireless communication system 1a is different from the optical wireless communication system 1 shown in FIG. 1 in that the optical wireless communication system 1a includes an exchange station device 10a instead of the exchange station device 10.

The exchange station device 10a includes the wireless transmitter/receiver 110, a DRoF EO/OE conversion unit 120a, the optical fiber network 130, and M (M is an integer of not less than 2) antenna units 140a. M antenna units 140a are written as antenna units 140a-1 to 140a-M. The DRoF EO/OE conversion unit 120a converts a signal output by the frequency conversion unit 112 from an electrical signal into an optical signal with DRoF, and outputs the optical signal to the optical fiber network 130. In addition, the DRoF EO/OE conversion unit 120a receives an optical signal output by the antenna unit 140a from the optical fiber network 130, converts the optical signal into an electrical signal with DRoF, and outputs the electrical signal to the wireless transmitter/receiver 110.

The antenna unit 140a-m (m is an integer of not less than 1 and not more than M) includes a DRoF OE/EO conversion unit 141a-m and an antenna element 142-m. The DRoF OE/EO conversion unit 141a-m converts an optical signal received from the optical fiber network 130 into an electrical signal with DRoF, and outputs the electrical signal to the antenna element 142-m. In addition, the DRoF OE/EO conversion unit 141a-m converts a wireless signal received by the antenna element 142-m from an electrical signal into an optical signal with DRoF, and outputs the optical signal to the optical fiber network 130.

According to the embodiment described thus far, it becomes possible for one wireless transmitter/receiver and a plurality of subscriber wireless transmitter/receivers to perform transmission and reception of information with time division via the RoF-PON without causing interference. Consequently, in the optical wireless communication system which extends the seeming coverage area by using RoF, it is possible to improve the user capacity efficiency of the wireless transmitter/receiver on the side of the exchange station. In addition, with the effect obtained by utilizing the PON, it becomes possible to significantly reduce the required length of the fiber as compared with a star network. Consequently, it becomes possible to significantly reduce the construction cost of the optical wireless communication system which uses RoF.

Note that the application of the embodiment described above is not limited to the millimeter wave band, and the embodiment can be applied to all radio frequencies.

According to the embodiment described above, with the synchronization control in the subscriber wireless transmission/reception device, ARoF is implemented with the TDM-PON in the optical fiber network in the form of the PON. With this, the wide coverage area of the wireless transmission is achieved at low cost.

Each of the wireless MAC TDM control unit 113 and the wireless MAC TDM control units 23-1 to 23-N includes a CPU (Central Processing Unit), a memory, and an auxiliary storage device which are connected to each other with a bus, and is caused to function as the device including the above-described functions by executing a program. Note that all or part of the functions of the wireless MAC TDM control unit 113 and the wireless MAC TDM control units 23-1 to 23-N may be implemented by using hardware such as an ASIC (Application Specific Integrated Circuit), a PLD (Programmable Logic Device), or an FPGA (Field Programmable Gate Array).

According to the embodiment described thus far, an optical wireless communication system has an exchange station device, and a plurality of wireless station devices which perform wireless communication with the exchange station device. The exchange station device includes a plurality of antenna units, a wireless transmitter/receiver, and a conversion unit. The plurality of antenna units perform processing of wirelessly transmitting an electrical signal obtained by converting an optical signal input via an optical transmission line to each wireless station device, and processing of converting a wirelessly received signal from the wireless station device into an optical signal and outputting the optical signal to the optical transmission line. The optical transmission line is, e.g., the optical fiber network 130. The wireless transmitter/receiver performs generation processing of a signal addressed to the wireless station device and reception processing of a signal from the wireless station device. The conversion unit performs processing of converting the signal generated by the wireless receiver into an optical signal and outputting the optical signal to each of the plurality of antenna units via the optical transmission line, and processing of receiving the signal from the wireless station device as an input via the optical transmission line from each of the plurality of antenna units, converting the input signal from an optical signal into an electrical signal, and transmitting the electrical signal to the wireless transmitter/receiver. The conversion unit is, e.g., the ARoF EO/OE conversion unit 120 or the DRoF EO/OE conversion unit 120a.

The wireless transmitter/receiver includes a signal generation unit, a transmission delay calculation unit, and a guard time determination unit. For example, the signal generation unit is the baseband processing unit 111, and each of the transmission delay calculation unit and the guard time determination unit is the wireless MAC TDM control unit 113. The signal generation unit generates a first signal which notifies timing of a time slot allocated to each wireless station device. The first signal is, e.g., the beacon. The transmission delay calculation unit calculates, for each wireless station device, a transmission delay by using a difference between a reception time of a second signal transmitted by the wireless station device correspondingly to the first signal and a reception time of a signal transmitted at the allocated timing by the wireless station device when it is assumed that there is no transmission delay. The guard time determination unit determines guard time between the time slots allocated to the wireless station devices based on the transmission delays of the wireless station devices calculated by the transmission delay calculation unit. For example, the guard time determination unit determines the guard time by using a value which is twice the maximum transmission delay selected from among the transmission delays of the wireless station devices.

The wireless station device includes a reception unit, a control unit, and a transmission unit. For example, each of the reception unit and the transmission unit is the subscriber wireless transmitter/receiver 22, and the control unit is the wireless MAC TDM control unit 23. The reception unit receives the first signal transmitted from the antenna unit of the exchange station device wirelessly. The control unit obtains information on timing allocated to the wireless station device to which the control unit belongs from the first signal, and performs control such that the second signal is transmitted at the timing. The transmission unit transmits the second signal to the exchange station device wirelessly according to the control of the control unit.

Note that the wireless transmitter/receiver repeats the transmission of the first signal, the reception of the second signal transmitted by each of a plurality of the wireless station devices correspondingly to the first signal, the calculation of the transmission delay in each wireless station device, and the determination of the guard time.

While the embodiment of the invention has been described in detail with reference to the drawings thus far, the specific configuration is not limited to the embodiment, and also includes design and the like within the scope not departing from the gist of the invention.

INDUSTRIAL APPLICABILITY

The present invention can be used in a system in which wireless communication is performed by using time division.

REFERENCE SIGNS LIST 1, 1a Optical wireless communication system
10, 10a Exchange station device
20-1, 20-i, 20-j, 20-n Wireless station device
21-1, 21-i, 21-j, 21-n Antenna element
22-1, 22-i, 22-j, 22-n Subscriber wireless transmitter/receiver
23-1, 23-i, 23-j, 23-n Wireless MAC TDM control unit
110 Wireless transmitter/receiver
111 Baseband processing unit
112 Frequency conversion unit
113 Wireless MAC TDM control unit
120 ARoF EO/OE conversion unit
120a DRoF EO/OE conversion unit
130 Optical fiber network
131 Optical branching unit
132, 133-1 to 133-M Optical fiber
140-1 to 140-M, 140a-1 to 140a-M Antenna unit
141-1 to 141-M ARoF OE/EO conversion unit
141a-1 to 141a-M DRoF OE/EO conversion unit
142-1 to 142-M Antenna element

The invention claimed is:

1. An optical wireless communication system in which an exchange station device and a plurality of wireless station devices perform wireless communication, wherein the exchange station device includes: a plurality of antenna units which perform processing of wirelessly transmitting an electrical signal obtained by converting an outgoing optical signal input via an optical transmission line to each of the plurality of wireless station devices and processing of converting a wirelessly received signal from a given wireless station device into an incoming optical signal and outputting the incoming optical signal to the optical transmission line; a wireless transmitter/receiver which performs generation processing of a data signal addressed to the given wireless station device and reception processing of the data signal from the given wireless station device; and a conversion unit which performs processing of converting the data signal generated by the wireless transmitter/receiver into an optical signal and outputting the optical signal to each of the plurality of antenna units via the optical transmission line and processing of receiving the signal from the given wireless station device as an input via the optical transmission line from each of the plurality of antenna units, converting the signal from an optical signal into an electrical signal, and transmitting the electrical signal to the wireless transmitter/receiver, the wireless transmitter/receiver includes: a signal generation unit which generates a first signal which notifies timing of a time slot allocated to each wireless station device; a transmission delay calculation unit which calculates, for each wireless station device, a transmission delay by using a difference between a reception time of a second signal transmitted by the wireless station device correspondingly to the first signal and a reception time of a signal transmitted at the allocated timing by the wireless station device; and a guard time determination unit which determines guard time between the time slots allocated to the wireless station devices based on the transmission delays of the wireless station devices calculated by the transmission delay calculation unit, and the given wireless station device includes: a reception unit which receives the first signal transmitted from a given antenna unit wirelessly; a control unit which obtains information on the timing allocated to the given wireless station device to which the control unit belongs from the first signal and performs control such that the second signal is transmitted at the allocated timing; and a transmission unit which transmits the second signal to the exchange station device wirelessly according to the control of the control unit.

2. The optical wireless communication system according to claim 1, wherein the wireless transmitter/receiver repeats transmission of the first signal, reception of the second signal transmitted by each of the plurality of wireless station devices correspondingly to the first signal, calculation of the transmission delay in each wireless station device, and determination of the guard time.

3. The optical wireless communication system according to claim 1, wherein the guard time determination unit determines the guard time by using a value which is twice a maximum transmission delay selected from among the transmission delays of the wireless station devices.

4. A wireless transmission/reception device used in an exchange station device which performs wireless communication with a plurality of wireless station devices, the wireless transmission/reception device comprising: a signal generation unit which generates a first signal which notifies timing of a time slot allocated to each of the plurality of wireless station devices, and outputs the first signal to a conversion unit which converts the generated first signal from an electrical signal into an optical signal and transmits the optical signal to each of a plurality of antenna units; a transmission delay calculation unit which receives a second signal transmitted wirelessly by a given wireless station device correspondingly to the first signal, received and converted into an optical signal by a given antenna unit, and converted from the optical signal into an electrical signal by the conversion unit, and calculates, for each wireless station device, a transmission delay by using a difference between a reception time of the second signal and a reception time of a signal transmitted at the allocated timing by the wireless station device; and a guard time determination unit which determines guard time between the time slots allocated to the wireless station devices based on the transmission delays of the wireless station devices calculated by the transmission delay calculation unit.

5. An optical wireless communication method in an optical wireless communication system in which an exchange station device and a plurality of wireless station devices perform wireless communication, the optical wireless communication method comprising: in the exchange station device, a signal generation step of generating, by a wireless transmitter/receiver, a first signal which notifies timing of a time slot allocated to each of the plurality of wireless station devices; a first conversion step of converting, by a conversion unit, the first signal generated in the signal generation step into an outgoing optical signal and transmitting, by a conversion unit, the outgoing optical signal to each of a plurality of antenna units via an optical transmission line; a first transmission step of receiving, by the plurality of antenna units, the first signal converted in the first conversion step as an input thereto via the optical transmission line, converting, by the plurality of antenna units, the input first signal into an electrical signal, and wirelessly transmitting, by the plurality of antenna units, the electrical signal to a given wireless station device; in the given wireless station device, a first reception step of receiving the first signal in the given wireless station device; a control step of acquiring information on the timing allocated to the given wireless station device from the first signal and performing control such that a second signal is transmitted at the timing in the given wireless station device; a second transmission step of transmitting the second signal to the exchange station device wirelessly according to the control in the control step; in the exchange station device, a second reception step of converting, by the plurality of antenna units, the wirelessly received second signal from the given wireless station device into an incoming optical signal and outputting, by the plurality of antenna units, the incoming optical signal to the conversion unit via the optical transmission line in the exchange station device; a second conversion step of receiving, by the conversion unit, the second signal output in the second reception step as an input thereto via the optical transmission line, converting, by the conversion unit, the input second signal into an electrical signal, and transmitting, by the conversion unit, the electrical signal to the wireless transmitter/receiver in the exchange station device; and the steps executed by the wireless transmitter/receiver including a transmission delay calculation step of calculating, for each wireless station device, a transmission delay based on a difference between a reception time of the second signal transmitted by the given wireless station device correspondingly to the first signal and a reception time of a signal transmitted at the allocated timing by the given wireless station device and a guard time determination step of determining guard time between the time slots allocated to the wireless station devices based on the transmission delays of the wireless station devices calculated in the transmission delay calculation step.

* * * * *